Figure 1:
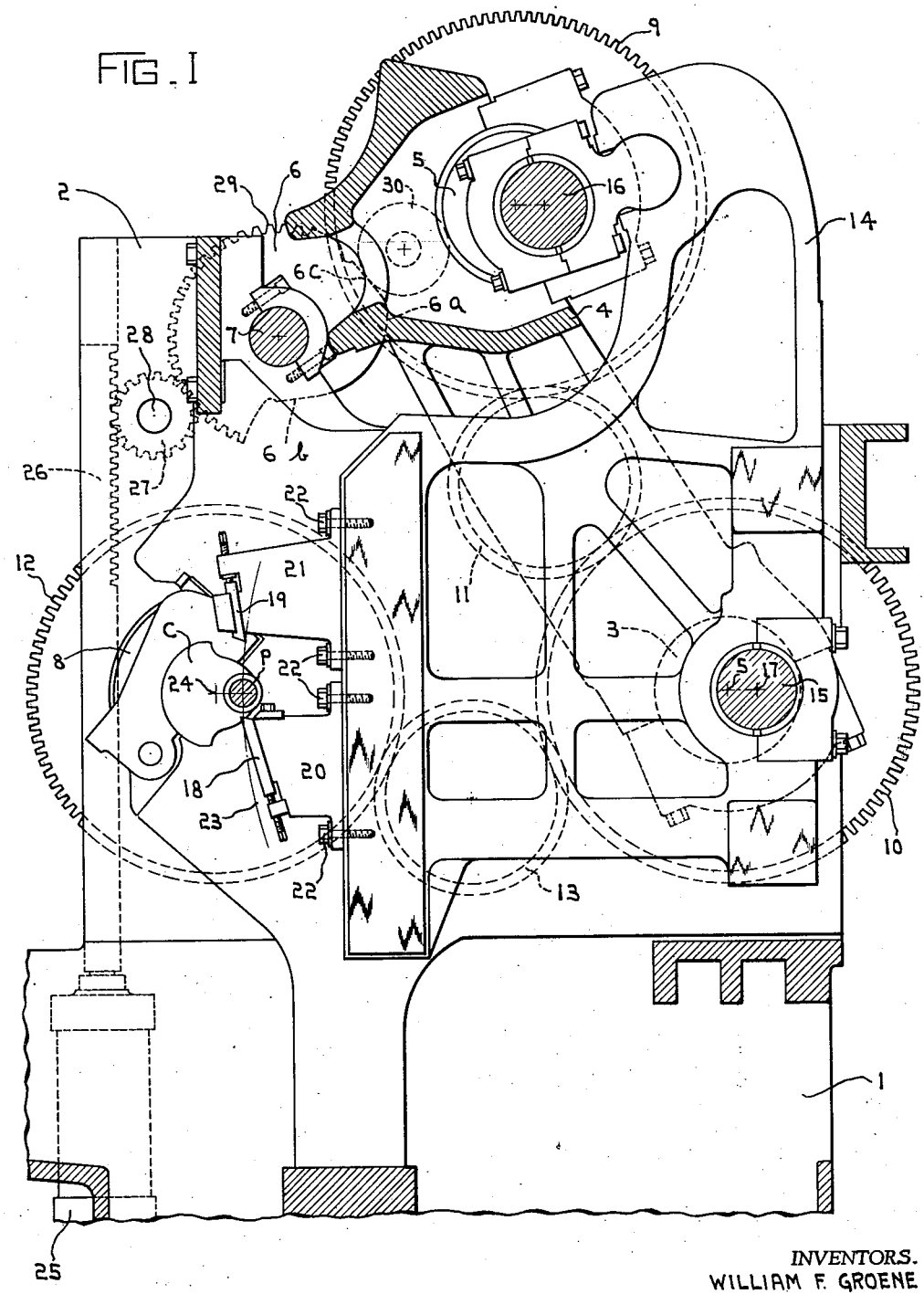

Feb. 18, 1941.    W. F. GROENE ET AL    2,232,324
ORBITAL LATHE
Filed Nov. 16, 1939    6 Sheets-Sheet 1

INVENTORS.
WILLIAM F. GROENE
HAROLD J. SIEKMAN
BY Willard S. Groene
ATTORNEY.

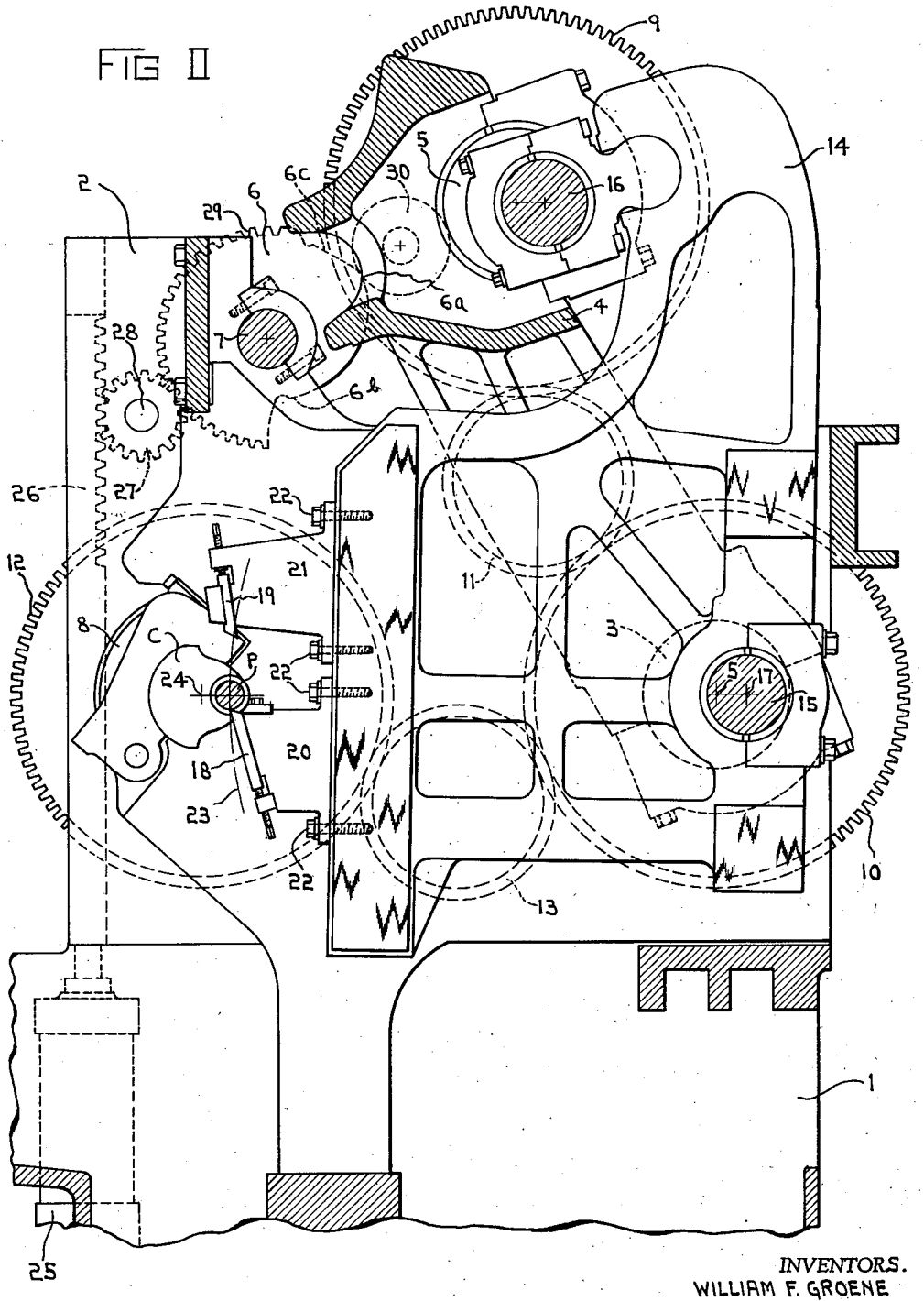

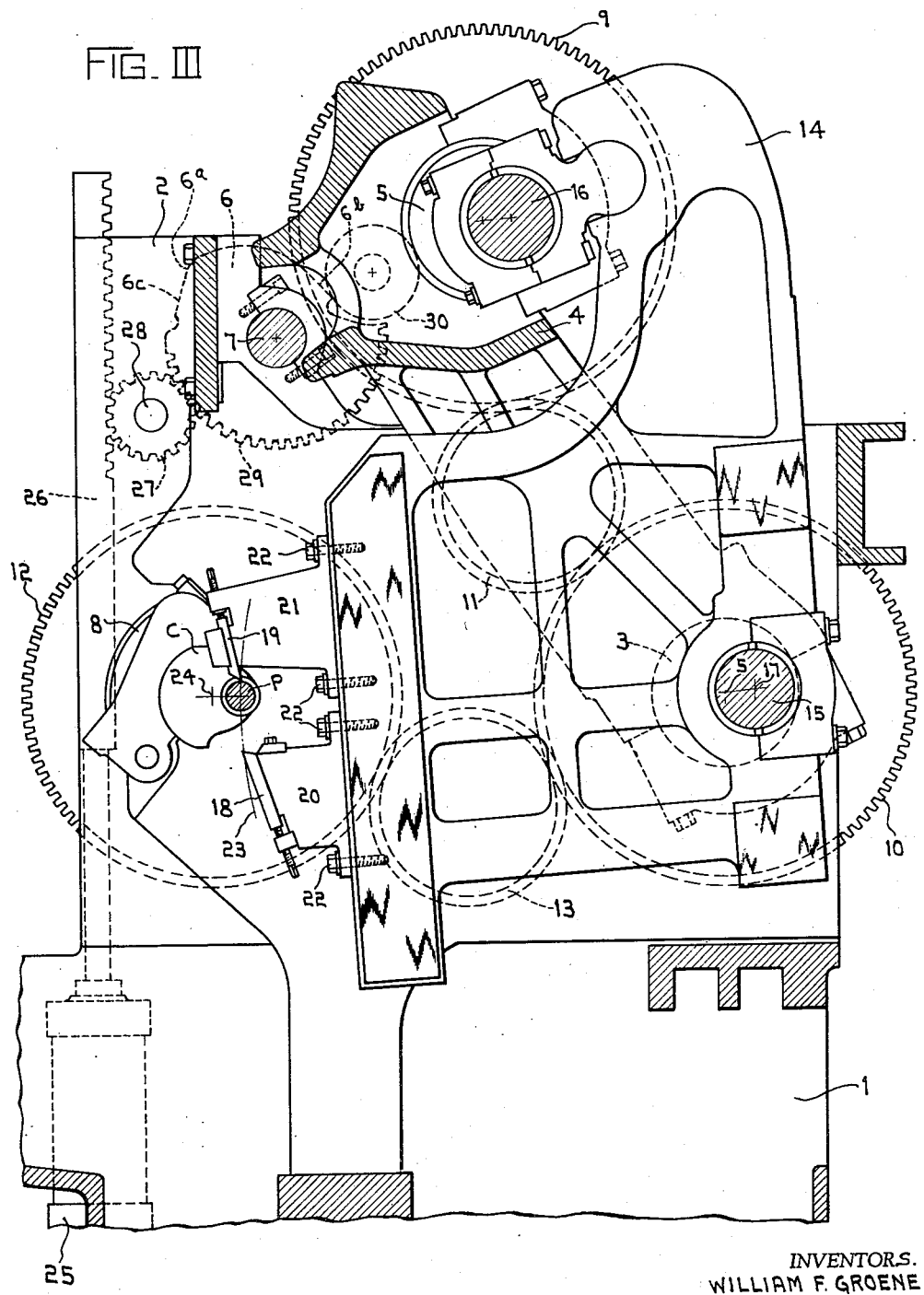

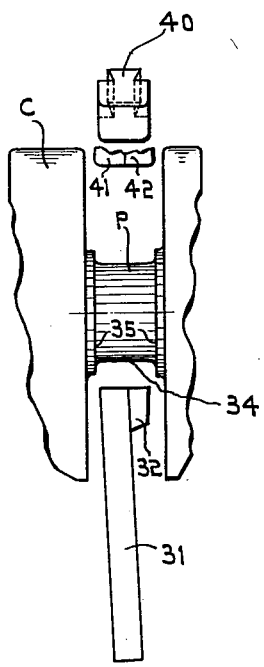
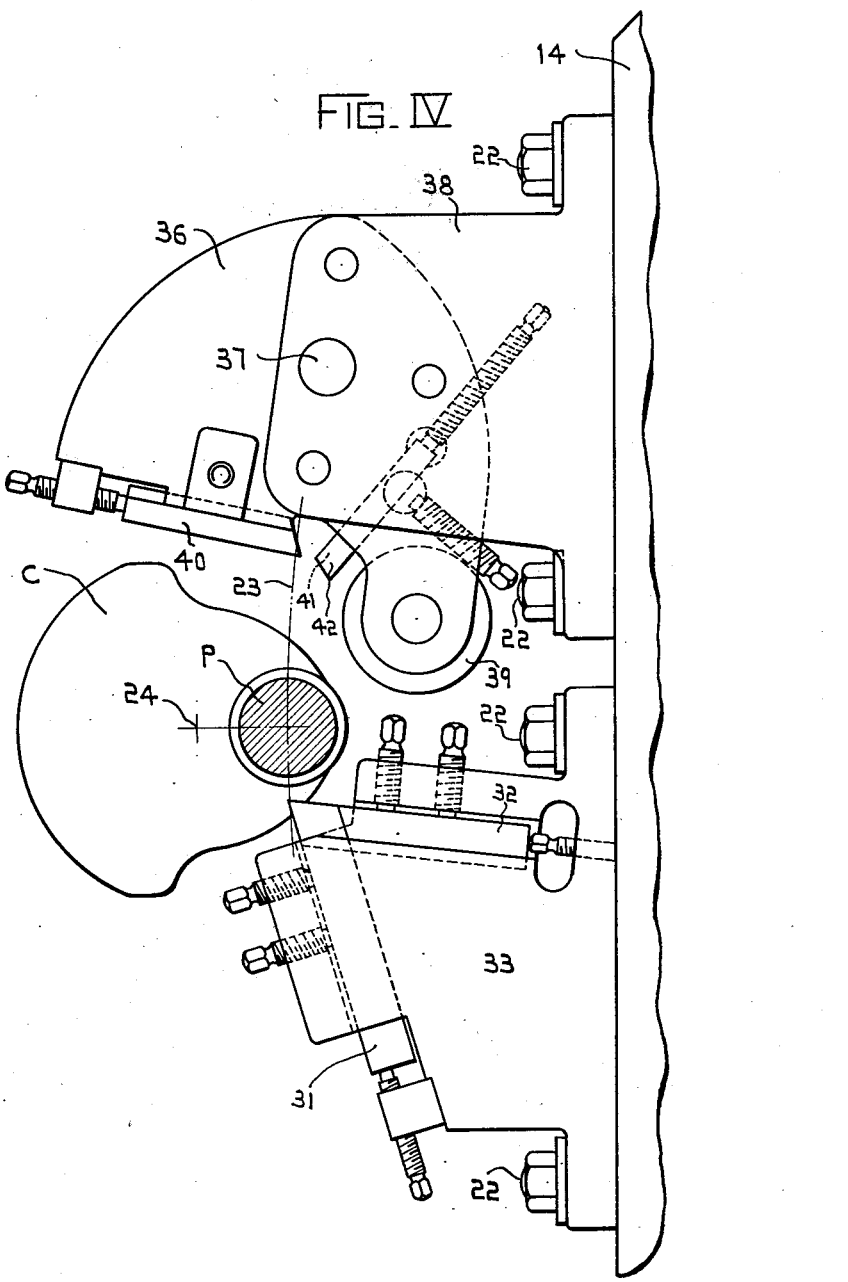

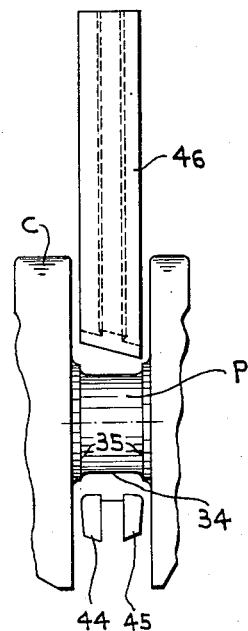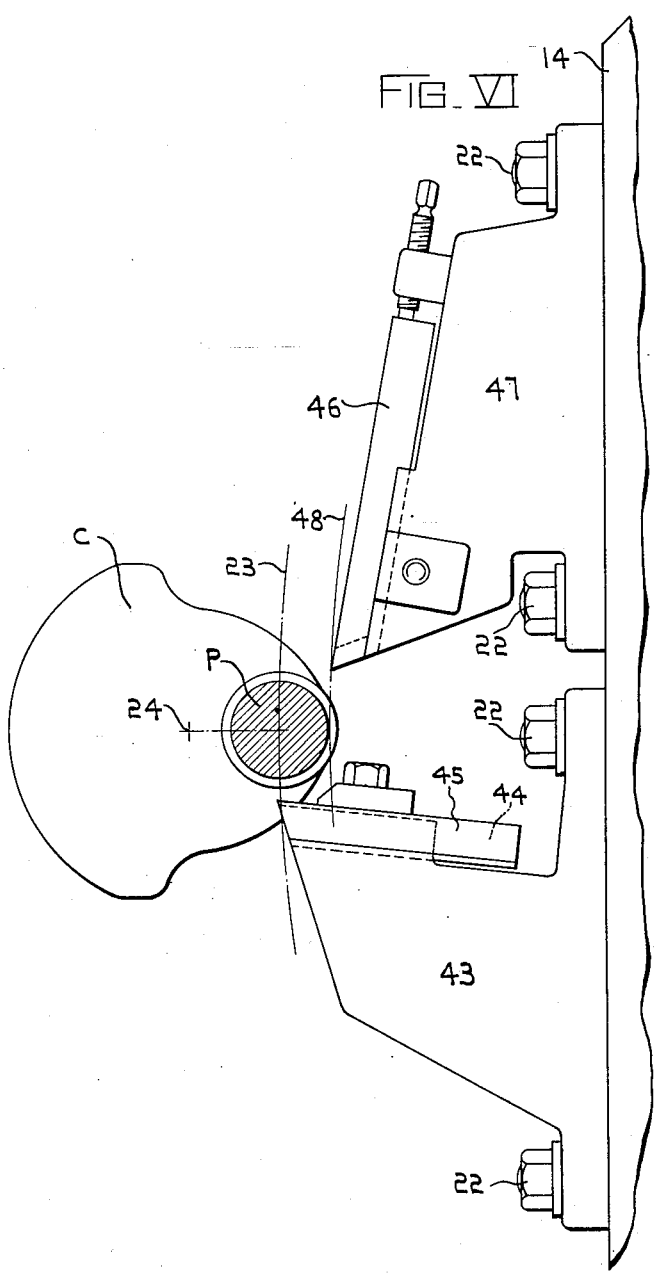

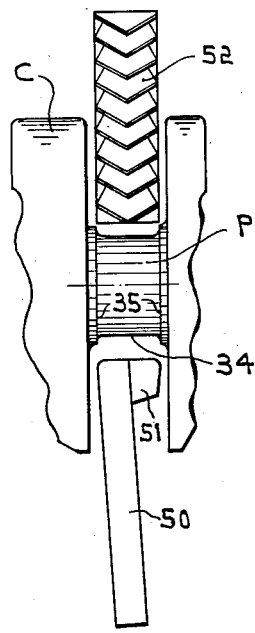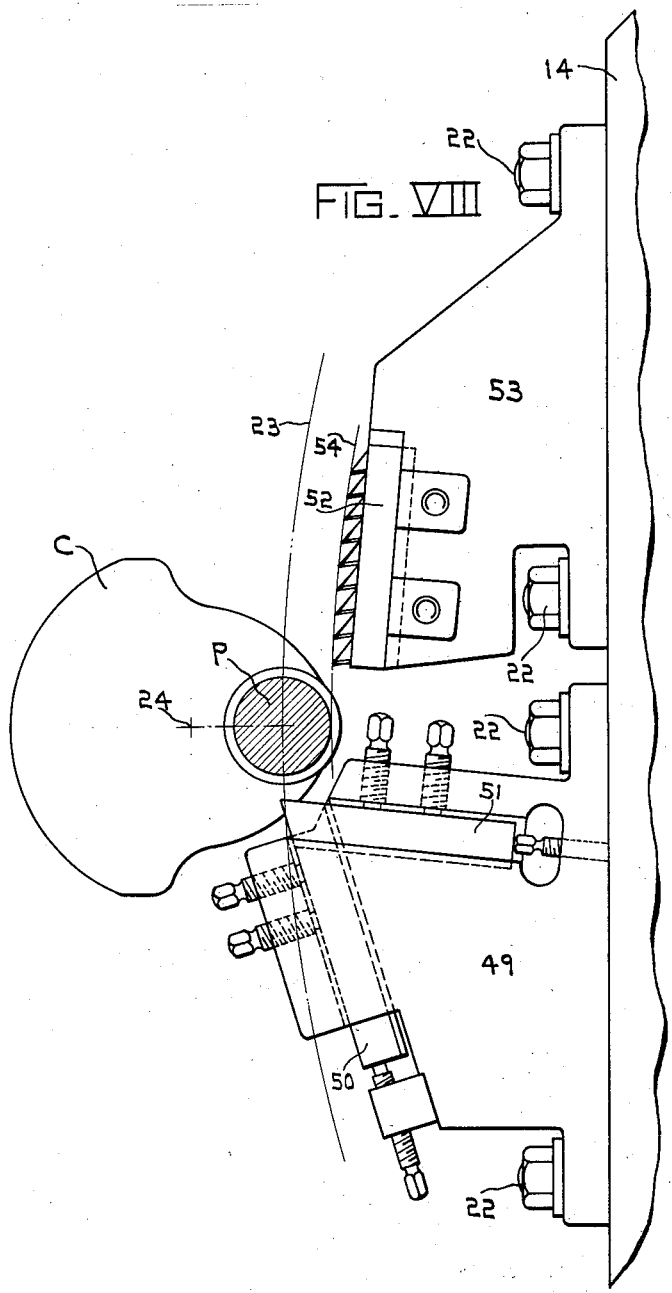

Patented Feb. 18, 1941

2,232,324

UNITED STATES PATENT OFFICE 2,232,324

ORBITAL LATHE

William F. Groene and Harold J. Siekmann, Cincinnati, Ohio, assignors to the R. K. LeBlond Machine Tool Company, Cincinnati, Ohio, a corporation of Delaware Application November 16, 1939, Serial No. 304,800

15 Claims. (Cl. 82—9)

This invention pertains to lathes and is related to apparatus for feeding the cutting tools of lathes to effect a roughing cut and a finishing cut on a work piece to be machined in said lathe. More specifically this invention pertains to orbital lathe adapted to the simultaneous machining of the crankpin bearings of multi-throw crankshafts which are rotated on their line bearing axis on the work spindle of such lathes.

The primary object of this invention is to provide a tool actuating mechanism for an orbital lathe for machining the pin bearings of a multi-throw crankshaft which permits the application of roughing tools to the crankpins and then the application of finishing tools to complete the accurate turning of these bearings of the work crankshaft.

Another object of this invention is to provide in an orbital lathe, having an orbitally moving tool carrier, means for moving said carrier in two different directions to effect a roughing cut and a finishing cut on the crankpin of a crankshaft to be machined.

Another object is to provide, in an orbital lathe having an orbitally moving tool carrier having different types of cutting tools, a feeding arrangement whereby each of said different types of tools may be selectively fed to a crankpin of crankshaft to be machined in said lathe by appropriately actuating the tool carrier.

Another object of this invention is to provide in an orbital lathe, having an orbitally moving tool carrier mounted on a pair of synchronously rotatable master crankshafts, an arrangement for effecting feeding movements in the tool carrier for successively feeding different types of cutting tools, mounted thereon, to a crankpin of a crankshaft to be machined in said lathe.

Further features and advantages of this invention will appear in the detailed description of the drawings in which:

Fig. I is a vertical transverse section through an orbital lathe incorporating the features of my invention, showing the orbitally moving tool carrier unit positioned in the neutral position at the time of loading or unloading work in the lathe.

Fig. II is a vertical transverse section, similar to that of Fig. I, but showing the orbitally moving tool carrier unit in position at the completion of the rough turning operation on the crankpin of a crankshaft in the lathe.

Fig. III is a similar vertical transverse section to that of Fig. I, but showing the orbitally moving tool carrier in position at the completion of the finish turning operation on the crankpin of the crankshaft.

Fig. IV is an enlarged fragmentary view of a tooling arrangement applicable to the orbitally moving tool carrier unit shown in Figs. I, II and III incorporating a fixed roughing tool and a pivotally mounted finishing tool.

Fig. V is a diagrammatic view showing the relationship of the cutting tools in Fig. IV to the crankpin to be machined on the crankshaft in the lathe.

Fig. VI is an enlarged fragmentary view of another tooling arrangement applicable to the orbitally moving tool carrier unit shown in Figs. I, II and III incorporating a fixed roughing tool and a fixed finish shaving tool mounted on the carrier.

Fig. VII is a diagrammatic view showing the relationship of the cutting tools of Fig. VII to the crankpin to be turned on the crankshaft.

Fig. VIII is an enlarged fragmentary view of part of the orbitally moving tool carrier showing a cutting tool arrangement incorporating a fixed roughing tool in combination with a finish broaching tool.

Fig. IX is a diagrammatic view showing the relationship of the cutting tool member of Fig. VIII to the crankpin to be machined on the crankshaft.

Noting particularly Figs. I, II and III, the machine comprises a base 1 upon which is mounted the housing 2. A master crankshaft 3 is journaled in the housing 2 and a feeding cradle 4 is mounted to swing about the line bearing axis 5 of the master crankshaft 3. A feeding cam 6 is carried on the camshaft 7 in the housing 2 to actuate the cradle 4 in feeding movement in both directions and to move the cradle to a neutral position for loading and unloading of work in the lathe. A work holder 8 is journaled in the housing 2 and is driven in synchronism with the master crankshaft 3 and a master crankshaft 5 carried in the upper end of the cradle 4 by means of the similar gears 9 and 10 fixed on the crankshafts 5 and 3 respectively which are interconnected by means of the idler gear 11 carried on an appropriate bearing mounting on the cradle 4; the work spindle 8 being rotated in synchronism with these two master cranks through the gearing comprising the large gear 12, which is like the gears 9 and 10, which is driven through the idler gear 13 journaled on the housing 2 of the machine. This arrangement will not be further described in greater detail as it is fully described in Patent 2,138,964 dated December 6, 1938.

The orbitally moving tool carrier 14 is mounted on the crankpin 15 of the master crankshaft 3 and on the crankpin 16 of the upper master crankshaft 5. Rotation of the cam 6 affects swinging motion in the cradle 4 which in turn causes the orbital tool unit 14 to swing about axis 17 of the crankpin 15 of the lower master crankshaft 3 to cause the cutting tools 18 and 19, carried on the respective tool blocks 20 and 21 fixed to the carrier 14 by appropriate screws 22, to follow a path substantially as indicated by the arcuate line 23 passing through the crankpin P being turned on the crankshaft C on the axis 24 of the work spindle 8 of the lathe. This cam 6 is uniquely arranged in that it is capable of swinging the cradle in either direction in feeding movement as it is actuated by the fluid pressure cylinder 25 carried in the base 1 of the machine which actuates a vertically reciprocatably rack 26 engaging an idler pinion 27 journaled on a suitable stud 28 fixed in the housing 2, this pinion 27 driving the cam 6 through its segmental gear portion 29. The periphery of this cam is so arranged that when the cylinder 25 is in the completely withdrawn or downward position the cam assumes the position shown in Fig. I with the roller 30 of the cradle 4 engaging the surface 6C of the cam 6 with the cradle rocked to its intermediate position so that both of the tools 18 and 19 are withdrawn from engagement with the crankpin P of the work to facilitate the loading and unloading of the crankshaft C into the lathe at the beginning or completion of the cutting operation.

Having thus loaded a work piece in the lathe as shown in Fig. I, fluid pressure is then appropriately applied to the cylinder 25 causing the cam 6 to rotate to the position indicated in Fig. II whereupon the high point 6a on the cam engages the roller 30 of the cradle 4 to raise the cradle upwardly and rearwardly bringing the tools 18 into action to complete the roughing operation on the crank pin P.

Having thus completed the rough turning operation by the tool 18, the cylinder is further actuated to continue rotation of the cam 6 until its low point 6b comes into engagement under the roller 30 of the cradle 4, thus permitting the cradle to move forwardly and downwardly bringing the finishing tool 19 into play until it has completed the finish turning operation on the crank pin to arrive at the position shown in Fig. III. The cylinder 25 is then reversed to again bring the cam 6 back to the position shown in Fig. I for unloading the completed work piece from the lathe in preparation for reloading with an unfinished work piece. It can thus be seen that by this arrangement the crankpin of a crankshaft may be turned in progressive manner by applying first a series of tools for taking off certain amount of the metal and then later applying further tools to complete this machining operation.

By means of this unique arrangement, the crankpins of a multi-throw crankshaft may be machined in a progressive manner by means of various different types of cutting tools. For example, in Fig. IV and V is shown an arrangement wherein a pair of roughing tools 31 and 32 carried in a tool block 33 fixed to the tool carrier unit 14 by appropriate means 22 first feed upwardly along the line 23 to rough out the diameter 34 and the side walls 35 of the crank pin P. Tool unit 14 is then fed downwardly carrying the pivotally mounted toolholder 36 carried on a pin 37 fixed in the tool block 38 mounted on the tool unit 14 by appropriate means 22 toward the work C. This toolholder carries a roller 39 which floatingly engages the diameter 34 of the crankpin P and has the finishing tool 40 which finish turns the diameter 34 of this crankpin P and the filleting tools 41 and 42 which finish trim the side walls 35 of this crankpin P upon the downward feeding movement of the tool unit 14. The tool then returns to the position shown in Fig. IV for easy removal or insertion of a new work piece to be machined.

As another example of the versatility of this unique arrangement, note Figs. VI and VII in which a finishing operation is performed by both sets of tools in the machine. The tool block 43 is fixed on the tool unit 14 by appropriate holding means 22 which carries a pair of finish cheeking tools 44 and 45 for accurately trimming the side walls 35 of the crankpin P. A shaving tool 46 carried in the tool block 47 also fixed on the tool unit 14 by appropriate means 22 completes the finish machining operation by the downward movement of the tool carrier unit 14 bringing its shaving cutting edge along the line of feeding 48 to complete the finish shaving of the pin diameter 34 to accurate dimension.

Also note Figs. VIII and IX in which a similar finish machining operation is completely accomplished by the dual motion of the orbitally moving tool carrier 14 in this unique arrangement. A tool block 49 fixed on the tool unit 14 by appropriate means 22 carries a pair of finishing tools 50 and 51 which feed upwardly by movement of the unit 14 to turn the side walls 35 of the crankpin P. A broach 52 is carried on the tool block 53 fixed to the unit 14 by appropriate means 22 and is arranged to feed along the line of feeding 54 to finish broach the crankpin diameter 34 as the tool unit 14 feeds downwardly bringing the broach tangently past the periphery of the crankpin P. The tool units then are returned to the neutral position as indicated in Fig. VIII for the withdrawal and insertion of work in the lathe.

Having thus fully set forth and described our invention what we claim as new and desire to secure by United States Letters Patent is:

1. In an orbital lathe, a frame, a rotatable work spindle journaled in said frame, a chucking device on said work spindle, an orbitally moving tool carrier mounted in the frame of said lathe, means for actuating said carrier and said work spindle in synchronism, a plurality of cutting tools fixed on said carrier, and means for affecting feeding movements in said carrier to successively present each of said cutting tools to said chucking device.

2. In an orbital lathe, a frame, a rotary work spindle mounted in said frame, a chucking device on said spindle, a pair of master crankshafts rotatable in synchronism with each other and with said work spindle, an orbitally moving tool carrier mounted on said master crankshafts, a plurality of cutting tools fixed on said tool carrier, and means for actuating said carrier so as to affect successive feeding of each of said cutting tools to said chucking device.

3. In an orbital lathe, a frame, a rotary work spindle mounted in said frame, an orbitally moving tool carrier mounted on said frame, a pair of cutting tools fixed on said carrier, means for rotating said work spindle and actuating said tool carrier in synchronism so as to cause said tools to follow an eccentric path, and means for effecting feeding movement in said carrier so as to successively feed one or the other of said cutting tools relative to said work spindle.

4. In an orbital lathe, a frame, a rotary work spindle mounted in said frame, an orbitally moving tool carrier mounted on said frame, means for rotating said work spindle and actuating said carrier in synchronous movement, a plurality of cutting tools fixed on said unit, means for actuating said tool carrier in arcuate feeding motion to affect the successive presentation of each of said cutting tools to said work spindle.

5. In an orbital lathe, a frame, a rotatable work spindle mounted on said frame, a master crankshaft journaled in said frame, a feeding cradle pivotally mounted around the main axis of said crankshaft, a second master crankshaft carried in said feeding cradle, means for rotating said master crankshafts in synchronism with each other and in synchronism with the rotation of said work spindle, an orbitally moving tool carrier mounted on the crank pins of said master crankshaft, turning tools fixed on said orbitally moving tool carrier, and means for actuating said cradle to effect successive feeding of said cutting tools to said work spindle.

6. In an orbital lathe, a frame, a rotary work spindle journaled in said frame, a master crankshaft journaled in said frame, a feeding cradle journaled around the main axis of said crankshaft a second master crankshaft journaled in said cradle, means for rotating said master crankshaft and said work spindle in synchronism, an orbitally moving tool carrier mounted on the pins of said master crankshafts, a plurality of cutting tools mounted on said orbitally moving tool carrier, cam means for actuating said cradle to effect successive feeding of said cutting tools to said work spindle, and fluid pressure means for actuating said cam means.

7. In an orbital lathe, a frame, a rotatable work spindle mounted in said frame, an orbitally moving tool carrier mounted in said frame, a plurality of cutting tools mounted on said tool carrier, means for actuating said tool carrier so as to successively present each of the cutting tools to said work spindle and to move said tool carrier to a neutral position with all of said cutting tools withdrawn from said work spindle.

8. In an orbital lathe, a frame, a rotary work spindle mounted in said frame, a master crankshaft journaled in said frame, a feeding cradle journaled about the main axis of said crankshaft, a second master crankshaft carried in said cradle, means for rotating said master crankshaft and said work spindle in synchronism, an orbitally moving tool carrier journaled on the crank pins of said master crankshafts, a plurality of cutting tools mounted on said tool carrier, means for actuating said cradle in feeding movement to effect successive feeding of each of said cutting tools to said work spindle, and means for bringing said cradle to a neutral position with all of said cutting tools removed from with said work spindle to facilitate loading and unloading of a work piece on said work spindle.

9. In an orbital lathe, a frame, a rotatable work spindle mounted in said frame, an orbitally moving tool carrier mounted on said frame, a pair of tools mounted on said carrier, means for moving said orbitally moving tool carrier in one direction to affect a feeding of one of said tools relative to said work spindle, means for moving said carrier in the opposite direction to affect a feeding of the other of said tools relative to said work spindle, and means for moving said tool carrier to a neutral position so as to position said work spindle intermediate a cutting tool to facilitate loading and unloading of said work piece into the lathe.

10. In an orbital lathe, a rotary work spindle journaled in the frame of said lathe, an orbitally moving tool carrier mounted on said frame, means for rotating said work spindle and affecting orbital motion in said carrier in synchronism, a roughing tool and a finishing tool fixed on said carrier, means for moving said carrier to affect successive feeding of said roughing tool and then said finishing tool relative to said work spindle, and means for positioning said tool carrier so both of said tools are moved to inoperative position to faciltate loading and unloading of work in said lathe.

11. In an orbital lathe, a rotatable work spindle journaled in the frame of said lathe, an orbitally moving tool carrier mounted on the frame of said lathe, means for rotating said work spindle and said tool carrier in synchronous motion, a plurality of cutting tools mounted on said orbitally moving tool carrier, means for actuating said carrier so as to move the cutting edges of said tools in an arcuate path while successively feeding each of said cutting tools relative to said work spindle.

12. In an orbital lathe, a rotatable work spindle journaled in a frame of said lathe, an orbitally moving tool carrier mounted on the frame of said lathe, means for rotating said work spindle and moving said tool carrier in synchronous motion, a plurality of cutting tools mounted on said orbitally moving tool carrier, means for actuating said carrier so as to move the cutting edges of said tools in an arcuate path while successively feeding each of said cutting tools to said work spindle, and means for positioning said orbitally moving carrier in a neutral position to render all of said cutting tools inoperative to facilitate loading and unloading of a work piece on the work spindle of said lathe.

13. In a lathe, a rotatable work spindle, a tool feeding member movable relative to said work piece, a roughing tool fixed on said member, a floatingly mounted tool holder carried on said member adapted to engage the work surface to be machined on said work piece and having cutting tools associated therewith, means for actuating said feeding member so as to successively feed said roughing tool and then said floatingly mounted tools relative to said work spindle, means for actuating said feeding member to move said cutting tools to inoperative position to facilitate loading and unloading of said work piece on said work spindle.

14. In a lathe, a rotatable work spindle, a tool feeding device movable relative to said work spindle, a roughing tool fixed on said feeding device, a shaving tool having a cutting edge angularly positioned relative to the axis of said work spindle fixed on said feeding device, means for actuating said feeding device so as to successively feed said roughing tool and then said shaving tool to said work spindle, and means for moving said tool feeding device to a neutral position so as to remove both of said cutting tools from operative positions relative to said work spindle to facilitate loading and unloading of work on said work spindle.

15. In a lathe, a rotatable work spindle, a tool feeding device movable relative to said work piece, a roughing tool fixed on said tool feeding member, a broach fixed on said tool feeding member, means for actuating said tool feeding member so as to successively feed said roughing tool and then said broach to said work spindle, and means for moving said member to a neutral position relative to said work spindle to facilitate unloading and loading of a work piece on said work spindle.

WILLIAM F. GROENE.
HAROLD J. SIEKMANN.